UNITED STATES PATENT OFFICE 2,149,678

ACID-AMINE CONDENSATION PRODUCTS

Almon G. Hovey, Pleasant Ridge, and Theodore S. Hodgins, Detroit, Mich., assignors to Helmuth Reichhold, Detroit, Mich., doing business as Reichhold Chemicals No Drawing. Application February 2, 1938, Serial No. 188,392

2 Claims. (Cl. 260—2)

The invention relates to acid-amine condensation products, and the process of making the same.

The claims of the present application are directed to resinous condensation products formed by fusing benzoylbenzoic acid and an organic amine wherein the said acid and amine constitute the principal reacting ingredients.

The present application is a continuation-in-part of our application Serial No. 147,569 filed June 10, 1937.

There are a large number of patents on urea condensation products but practically all of them cover tedious delicate processes requiring very careful control of such conditions as pH and temperature. The ingredients must be carefully reacted in a certain prescribed order and very specific directions followed or else the product is likely to go over to a useless white insoluble precipitate, or else to a gel. Most of these patents covering urea resins are intended for moulding purposes. The preparation of surface coating resins from urea is much more difficult than the preparation of moulding compositions. Surface coating resins must be miscible with the commonly used paint, varnish and lacquer ingredients, and require skill not given in any publication heretofore. Furthermore, in the manufacture of urea resins it has not been possible to make products which are as easy to cook or as foolproof in manufacturing as the alkyd resins. It has not been possible to make resins by fusing urea or other amines with other reactive ingredients at relatively high temperatures because gelation inevitably takes place at too rapid a rate even for a rough control.

A fusion method would be highly desirable because it would avoid the tendency towards precipitation when an aqueous formaldehyde solution is used and it would avoid dangerous formation of steam should the reaction "run away." Furthermore, the fusion method would allow the use of higher temperatures similar to those used in alkyd resin formation and with a much better chance of obtaining resinification than if the reaction were carried on in an aqueous solution.

We have found how to make resins by such a fusion process, and we have found that not only urea may be used, but a large variety of amines, including mono-amines, which hithertofore have been regarded as inoperative or unsuitable for any type of resin formation. Mono-amines and other amines may have been suggested as modifying agents for resins, but have never been considered as the basic resin-forming ingredients. In our process, no control of pH is necessary, the resinification taking place under as orderly conditions as in the case of the alkyd resins, instead, of requiring the meticulous control of artificial conditions which is necessary in the case of the urea-formaldehyde processes which have been hithertofore described. It is not necessary that a solvent or dispersing medium be present; our operations consist only of fusing the ingredients, i. e., the acid and amine. Thus, the apparatus required for carrying out our process is less complicated and less expensive. The obvious simplicity of our process makes it especially desirable. The increasing availability and potential low cost of producing many amines makes our process even more desirable.

These resins are formed when various organic acids are reacted with urea, isobutyl amine or with several other amines, as shown by the general reaction:

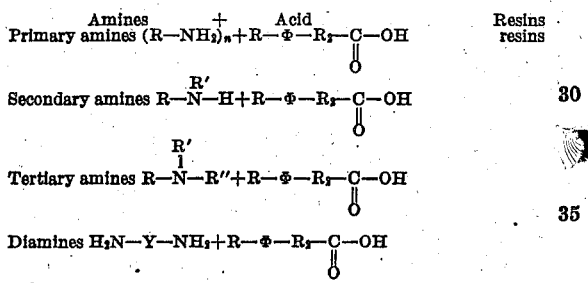

Where

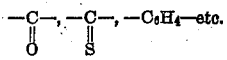

R, R', R″ = alkyl or aryl groups.
Y = a group such as

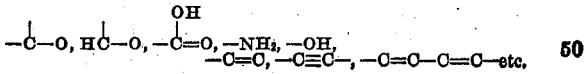

$n \geq 1$
$R_1$ = segment of hydrocarbon structure (alkylene or arylene), e. g., —$CH_2$—, —$C_2H_4$—, —$C_6H_4$— etc.
$\Phi$ = any functional group, such as $$-\overset{|}{C}-O, \ H\overset{|}{C}-O, \ -\overset{OH}{\underset{|}{C}}=O, -NH_2, -OH, \ -C=O, -C\equiv C-, -C=C-C=C-\text{etc.}$$

These reactions fall into four general classes based on the variation of the acidic component with the assumption that amines are operative equivalents, i. e., that the trivalent nitrogen becomes pentavalent.

1. Ketonic acid+amine→"ketacine" resins.
2. Unsaturated acid+amine→"unacine" resins.
3. Dibasic acid+amine→"dibacine" resins.
4. Hydroxy acid+amine→"hydracine" resins.

These resins which we are describing are not to be confused with the resins such as are described in Weisberg and Greenwald U. S. Patent No. 1,918,222, in which a resin which is essentially an alkyd resin is disclosed which is obtained by fusing phthalic anhydride with triethanolamine. In this case the triethanolamine is simply described as another polyhydric body which might be used as a substitute for glycerol, a trihydric alcohol. Triethanolamine and phthalic anhydride should form a resin in exactly the same way and according to the same principle as does glycerol and phthalic anhydride as described by Kienle and Hovey (Journal of The American Chemical Society, volume 501, page 512, (1929)). We have found that amines without any hydroxyl groups form resins with the organic acids of the generic formula R—Φ—R₂—COOH (as mentioned previously), this being an entirely unexpected result which is entirely outside the classification of alkyd resins, the definition of an alkyd resin by Kienle and Ferguson being a "product of polybasic acids and polyhydric alcohols" (Industrial and Engineering Chemistry, volume 21, pages 349-52, (1929)).

This application is one of a series in which resins made from amine and various types of organic acids are described. The present application concerns itself with the resins formed from amine and ketonic acid. These new and useful resins are formed by simple fusion without the necessity of using catalysts and without the necessity of carrying out the reactions in solvent or in the presence of a fluxing medium of any sort, and without the necessity of controlling pH. For the sake of simplicity, these resins formed from ketonic acid and amine have been contracted to the term "ketacine" resins, and hereafter in this application shall be termed "ketacine" resins.

The ketonic acids which form "ketacine" resins with amines according to our invention come under the classification of the following general formula:

R.CO.R'.COOH

Where
R =an alkyl or aryl group, and
R' =an alkylene or arylene group (carbon atom length may be 0 to n).

Specific examples of this general formula are:

Pyruvic acid CH₃.CO.COOH
Aceto-acetic acid CH₃.CO.CH₂.COOH
Benzoylbenzoic acid C₆H₅.CO.C₆H₄.COOH
Benzophenone-dicarboxylic acid
C₆H₅.CO.C₆H₃.(COOH)₂
Benzoyl acrylic acid C₆H₅.CO.CH:CH.COOH
Paramethylisopropylorthobenzoylbenzoic acid
C₆H₃(CH₃)(C₃H₇).CO.C₆H₄.COOH The following table giving many general examples of how various types of resins may be prepared according to our invention by fusing ketonic acids with amines, permits one to gain some idea of the breadth of the ketacine family of resins together with some idea of their importance.

General Examples

Table I

I. Pyruvic acid + urea→red-orange resin.
Pyruvic acid + isobutyl amine→yellow-orange resin.
Pyruvic acid + aniline→yellow-orange resin.
Pyruvic acid + hexamethylene tetramine→red-orange resin.
Pyruvic acid + formamide→red-orange resin.
Pyruvic acid + succinimide→yellow-orange resin.
Pyruvic acid + thiourea→black resin.
Pyruvic acid + triethanolamine→orange-brown resin.

II. Aceto-acetic acid + urea→yellow resin.

III. Benzoylbenzoic acid + urea→yellow resin.
Benzoylbenzoic acid + isobutylamine→light straw colored resin.
Benzoylbenzoic acid + acetamide→green resin.
Benzoylbenzoic acid + aniline→yellow-orange resin.
Benzoylbenzoic acid + hexamethylene tetramine→dark brown resin.
Benzoylbenzoic acid + formamide→green resin.
Benzoylbenzoic acid + succinimide→brown resin.
Benzoylbenzoic acid + thiourea→brown resin.
Benzoylbenzoic acid + monoamylamine→water-white resin.
Benzoylbenzoic acid + diamylamine→brown resin.
Benzoylbenzoic acid + triamylamine→yellow resin.
Benzoylbenzoic acid + monomethylamine→water-white resin.
Benzoylbenzoic acid + dimethylamine→water-white resin.
Benzoylbenzoic acid + trimethylamine→water-white resin.
Benzoylbenzoic acid + pyridine→water-white resin.
Benzoylbenzoic acid + dimethylaniline→water-white, sticky balsam resin.

IV. Paramethylisopropylorthobenzoylbenzoic acid + urea→light straw colored resin.

V. Benzoylacrylic acid + urea→reddish-brown resin.
Benzoylacrylic acid + isobutylamine→orange balsam resin.
Benzoylacrylic acid + aniline→yellow-orange resin.

VI. Benzophenonedicarboxylic acid + urea→water-white resin.
Benzophenonedicarboxylic acid + isobutylamine→red resin.

The following are specific examples of how "ketacine" resins may be prepared according to our invention:

Example I

One mol of urea is reacted with one mol of benzoylbenzoic acid at 150° C. The ingredients were heated to 150° C. in 10 minutes and then held at 150° C. for 30 minutes or longer. As the reaction proceeded the acid number decreased and the color of the resinous product changed from water-white to yellow. The maturing of the resin is shown by the fact that the curing time on a hot plate at 200° C. decreased from 25 seconds to 2 seconds necessary to obtain gelatinization. This is shown by the following table:

TABLE II

*Change in acid number and cure of a resin formed from one mol benzoyl benzoic acid and one mol urea*

| Time at 150° C.* | Acid number | Cure** | Color of product |
|---|---|---|---|
| | | Seconds | |
| 0 minutes | 164 | 25 | Water-white. |
| 5 minutes | 160 | 14 | Do. |
| 10 minutes | 145 | 12 | Do. |
| 15 minutes | 132 | 9 | Pale yellow. |
| 20 minutes | 115 | 8 | Yellow. |
| 25 minutes | 98 | 5 | Do. |
| 30 minutes | 88 | 2 | Do. |

*10 minutes were required to fuse the materials and obtain 150° C.
**Hot plate temperature 200° C.

When means are used to protect the color which are known to the art, a much lighter colored product is obtained.

*Example II*

To one mol of benzoyl benzoic acid, two mols of isobutylamine are added. An exothermic reaction takes place which warms the mixture of ingredients to approximately 70° C. These ingredients are allowed to react from their own heat for a period of 10–30 minutes and then when the reaction has run its course, the reaction may be carried further by supplying heat to the reaction mixture. The heating is best done at about 150° C. using a reflux condenser to prevent the escape of isobutylamine. When the refluxing has proceeded far enough so that there is no odor of isobutylamine the condenser may be removed and heating discontinued. This process forms a pale straw colored resin. This material was soluble, while hot, in mineral spirits about one volume to one volume, but when it cooled the resin precipitated from solution. When this material was thinned with butanol, it formed a very stable solution which blended with practically all of the commercial types of alkyd resins even if they were already cut 50% in mineral spirits.

This family of resins made from ketonic acids and amines may be modified by other ingredients to vary the properties in much the same way that alkyd resins made from polybasic acids and polyhydric alcohols have been modified with the fatty acids, resinous acids and phenolic condensation products. It will be understood that many such modifications of this family of resins may be made to form new products with new and still further useful properties. It is to be understood that such modifications also come under the scope of this invention.

On the other hand, if one should use ketacine resins to modify other resinous products, these uses of the "ketacine" resins are to be considered as applications of this invention and also included by it. As an example for a use of our invention to modify other resinous products the following is cited as illustrative:

The resin made from benzoyl benzoic acid and isobutylamine as shown in Example II is used in combination with the urea-formaldehyde condensation process. 200 parts of the resin prepared as in Example II, and 62 parts of formaldehyde (commercial solution 37–40%), and 30 parts of urea are reacted together. First the formaldehyde is added to the resin made from benzoyl benzoic acid and isobutylamine and a cloudy white precipitation occurs during the initial stages of reaction, but this soon clears up between 50–60° C. When the formaldehyde is added the temperature rises from room temperature to 50–70° C. Upon adding 30 parts of urea the solution became somewhat cloudy and viscous, but it becomes clear upon gradually increasing the temperature to 95° C. and holding at this temperature. The material becomes more and more viscous and continues to remain clear. When the desired viscosity is obtained the material may be thinned with butanol to a 60% solution. This clear straw colored viscous solution in butanol is miscible with all types of commercial alkyd resin solutions such as the oil or oil acid modified types of polybasic acid-polyhydric resins in solution form, using hydrocarbon solvents either of the aromatic or aliphatic types. The product is soluble in butanol, xylol or toluol to practically any proportion and soluble to approximately equal parts by volume in mineral spirits. This modified urea-formaldehyde condensation product bakes out to a clear and hard film either by itself or in combination with the oil or oil acid modified alkyd resins showing complete compatibility of the resin even in the baked film where the solvents have had a chance to evaporate.

Products made along orthodox varnish and lacquer technology with resins of the "ketacine" family are to be considered as applications of this resin family and to be covered by the scope of this invention. It is to be further understood that certain catalysts may be used to promote further resinification of these ingredients or to accomplish this purpose in a shorter time. In some cases where resins form with difficulty we have found it especially helpful to introduce such a catalyst. An instance of this is in the case of isobutylamine and pyruvic acid, in which the resinification is speeded up materially. We anticipate that any process which undertakes the simultaneous reduction of a nitro compound to an amine and at the same time resinifying the resulting amine with a ketonic acid to be within the scope of our invention. For example, we have shown that aniline, the reduction product of nitrobenzene can form a resin with ketonic acid.

In surface coatings such as lacquers and varnishes these resins, on account of their adhesive properties, increase the value of surface coatings, especially lacquers, where they increase adhesion, toughness and hardness of the resulting product. The usefulness of these products is not limited to surface coating materials as it extend into plastic moulding compounds as well and particularly into rubber since they reduce the porosity of rubber and increase the adhesion and tend to act as anti-oxidants and, in the case of the thiourea "ketacine" resins, they tend to act as vulcanization accelerators as well. Many of these resinous products are characterised by extremely light color and color retention.

We claim:

1. A resinous condensation product prepared by fusing benzoylbenzoic acid and an organic amine, said acid and amine constituting the principal reacting ingredients.

2. A process of preparing a resinous condensation product which comprises fusing benzoylbenzoic acid and an organic amine, said acid and amine constituting the principal reacting ingredients.

ALMON G. HOVEY.
THEODORE S. HODGINS.